US006434388B1

(12) United States Patent
Szalajski

(10) Patent No.: US 6,434,388 B1
(45) Date of Patent: Aug. 13, 2002

(54) CORDLESS COMMUNICATION SYSTEM OPERATING UNDER THE DECT STANDARD

(75) Inventor: David Szalajski, Versailles (FR)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/201,497

(22) Filed: Nov. 30, 1998

(30) Foreign Application Priority Data

Dec. 2, 1997 (FR) ............................................. 97 15435

(51) Int. Cl.[7] .................................................. H04Q 7/00
(52) U.S. Cl. ........................ 455/437; 455/463; 455/464; 455/436
(58) Field of Search ................................. 455/437, 525, 455/422, 432, 436, 440, 443, 444, 524, 446, 62, 450, 463, 464, 421, 403, 67.1, 67.3

(56) References Cited

U.S. PATENT DOCUMENTS

| 4,799,253 | A | * | 1/1989 | Stern et al. ..................... 379/59 |
| 4,975,939 | A | * | 12/1990 | Sasaki ........................... 379/60 |
| 5,109,527 | A | * | 4/1992 | Akerberg .................... 455/33.2 |
| 5,241,691 | A | * | 8/1993 | Owen ........................... 455/54.2 |
| 5,258,981 | A | * | 11/1993 | Davey et al. ................. 370/95.1 |
| 5,353,332 | A | * | 10/1994 | Raith et al. ..................... 379/59 |
| 5,471,671 | A | * | 11/1995 | Wang et al. .............. 455/226.2 |
| 5,784,693 | A | * | 7/1998 | Barber et al. ................ 455/434 |
| 5,832,367 | A | * | 11/1998 | Bamburak et al. ............. 455/62 |
| 5,838,746 | A |   | 11/1998 | Bellec |
| 5,864,759 | A | * | 1/1999 | Tat ................................ 455/437 |
| 5,896,570 | A | * | 4/1999 | Saunders et al. ............ 455/437 |
| 5,903,832 | A | * | 5/1999 | Seppanen et al. ............ 455/414 |
| 5,943,622 | A | * | 8/1999 | Yamashita .................... 455/509 |
| 6,041,240 | A | * | 3/2000 | McCarthy et al. ........... 455/464 |
| 6,119,000 | A | * | 9/2000 | Stephenson et al. ......... 455/432 |
| 6,122,519 | A | * | 9/2000 | Tat ................................ 455/450 |

FOREIGN PATENT DOCUMENTS

| EP | 359535 A2 | * | 3/1990 | ............. H04Q/7/04 |
| EP | 0757500 |   | 2/1997 | ............. H04Q/7/32 |
| EP | 0757500 A2 | * | 5/1997 | ............. H04Q/7/32 |
| EP | 0780999 |   | 6/1997 | ............. H04B/7/26 |
| EP | 0780999 A2 | * | 6/1997 | ............. H04B/7/26 |
| GB | 2173377 A | * | 3/1990 | ............. H04B/7/26 |
| JP | 5-83191 |   | 4/1993 | ............. H04B/7/26 |
| JP | 06165234 A |   | 6/1994 | ............. H04Q/3/58 |
| JP | 08047044 A |   | 2/1996 | ............. H04Q/7/38 |
| JP | 10257567 A |   | 9/1998 | ............. H04Q/7/39 |

* cited by examiner

*Primary Examiner*—Daniel Hunter
*Assistant Examiner*—Pablo Tran
(74) *Attorney, Agent, or Firm*—Irena Lager

(57) ABSTRACT

The present invention relates to a cordless communication system with high user capacity, especially cordless communication systems operating under the DECT standard. This system comprises fixed or mobile terminals (T1, T2, T3, T4), radio sets (B1, B2, B3) with which the terminals can communicate, and radio controllers (CR1, CR2) linked groupwise to the radio sets. The collection of radio controllers manages the collection of radio sets. Each terminal continually examines the state of the radio set, saturated or otherwise, onto which it is locked, and then, if the radio set is saturated, triggers a new operation of locking onto another radio set.

7 Claims, 2 Drawing Sheets

(No channel avaliable on set B2)

CORDLESS COMMUNICATION SYSTEM OPERATING UNDER THE DECT STANDARD

CROSS-REFERENCE TO RELATED APPLICATION

This application claims priority of France Patent Application No. 9715435, which was filed on Dec. 2, 1997.

FIELD OF THE INVENTION

The present invention relates to a cordless communication system, and more particularly to a cordless communication system with high user density, especially a cordless communication system operating under the DECT standard.

BACKGROUND OF THE INVENTION

One of the most interesting and most promising cordless technologies in the field of subscriber line networks is unquestionably the Digital European Cordless Telecommunication (DECT) system. The frequency band used in this system, from 1880 to 1900 MHz, is partitioned into ten carrier frequencies each having a frame structure according to the Frequency Division Multiple Access (FDMA) technique. Each carrier is divided into 24 time slots, 12 of which serve for transmission from the terminal to the radio set and the other 12 of which serve for transmission from the radio set to the terminal. This method raises the capacity of the system to 120 channels, each radio set being able to transmit on each channel, and to simultaneously transmit on twelve of them. A two-way communication requires just two time slots; the terminal can then devote the other time slots to monitoring the channels available within its range, and do so at all frequencies.

The architecture of a network operating under the DECT system generally includes portable or fixed terminals, radio sets and radio controllers. An exemplary network is depicted in FIG. 1. Fixed or mobile terminals T1, T2, T3 and T4 communicate with radio sets B1, B2 and B3, which are managed by radio controllers CR1 and CR2. The radio controllers CR1 and CR2 are linked to the conventional telephone network. When terminals T1, T2, T3 and T4 are switched on, or in the event that lock-on is lost, each of the terminals locks onto a radio set. The terminals lock onto a channel transmitted by the said radio set and extract information therefrom about the network. This information will make it possible to choose a channel available at the time of transmission. The terminal generally locks onto the channel offering the best signal quality.

When the terminal wants to transmit a communication to this radio set, the terminal chooses an available channel in order to transmit to this radio set. Each radio set can handle up to 12 communications simultaneously. However, it is possible to lock a larger number of terminals onto the same radio set since the probability that they will all be communicating at the same time is fairly low. In the example of FIG. 1, the terminals T1, T2 and T4 are communicating with the radio sets B1, B2 and B3 respectively, while the terminal T3 is not communicating. Terminal T1 transmits on channel C3 of frequency f3, terminal T2 on channel C4 of frequency f2, and terminal T4 on channel C10 of frequency f3. Terminal T3 is locked onto the radio set B2.

Furthermore, radio controller CR1 manages the radio sets B1 and B2. Radio controller CR2 manages radio set B3. The radio controllers manage the communications originating from the radio sets and are an interface with the conventional telephone network.

This dynamic and decentralised allocation of the channels allows efficient management of resources in accordance with actual requirements. However, there are two cases in which a terminal cannot establish a communication:

1) if the terminal is locked onto a radio set which is already managing twelve communications;
2) if the terminal is locked onto a radio set linked to a radio controller which is saturated.

In these two cases the incoming or outgoing call is blocked.

SUMMARY OF THE INVENTION

An objective of the invention is to propose a cordless communication system operating under the DECT standard which enables a communication to be established in one and/or other of the above two cases.

The invention solves the above problems by taking into account the signalling information present in the system in order to choose the lock-on set. The invention provides a cordless communication system operating under the DECT standard, comprising fixed or mobile terminals, and radio sets with which the terminals can communicate. Each terminal locks onto a radio set when it is switched on or in the event that lock-on is lost. The radio sets are linked groupwise to radio controllers. The collection of radio controllers manages the collection of radio sets. The radio controllers are linked to the telephone network. Each radio set is able simultaneously to handle up to twelve communications without being saturated. Each terminal continually examines the state, saturated or otherwise, of the radio set onto which it is locked, and then, if the radio set is saturated, triggers a new operation of locking onto another radio set. This system makes it possible to cope with the case in which the radio set is already handling twelve communications.

To handle the case in which the radio controller linked to its radio set might be saturated, each terminal examines the state, saturated or otherwise, of the radio controller linked to its radio set. If the radio controller is saturated, the terminal triggers a new operation of locking onto another radio set linked to another radio controller.

BRIEF DESCRIPTION OF THE DRAWINGS

Other characteristics and advantages of the invention will emerge on reading the detailed description which follows and which is given with reference to the appended drawings in which.

DETAILED DESCRIPTION

According to the invention, there is provision to trigger a new lock-on operation if the radio set onto which the terminal is locked is already handling twelve communications. The information concerning the state (saturated or otherwise) of the radio set is accessible at the level of the system link layer, in the system signalling information. This layer is responsible for controlling access to the transmission medium (MAC or Medium Access Control layer).

Signalling information is contained in the field A of the channel to which the terminal is locked. The radio set therefore transmits information about its state, saturated or otherwise. It also transmits information about the radio controller located downstream of the radio set. The terminal is therefore continually aware of the state of the radio set onto which it is locked and the state of the corresponding radio controller.

Thus, according to the invention, if the radio set is saturated the terminal triggers a new operation of locking onto another radio set, having previously stored in memory the saturated radio set. The terminal will perhaps avoid transmitting on carrier frequencies from which it is barred for various reasons. Once it has locked onto a non-saturated radio set, the terminal is then able to receive or to establish a communication at any time.

Figure 1:
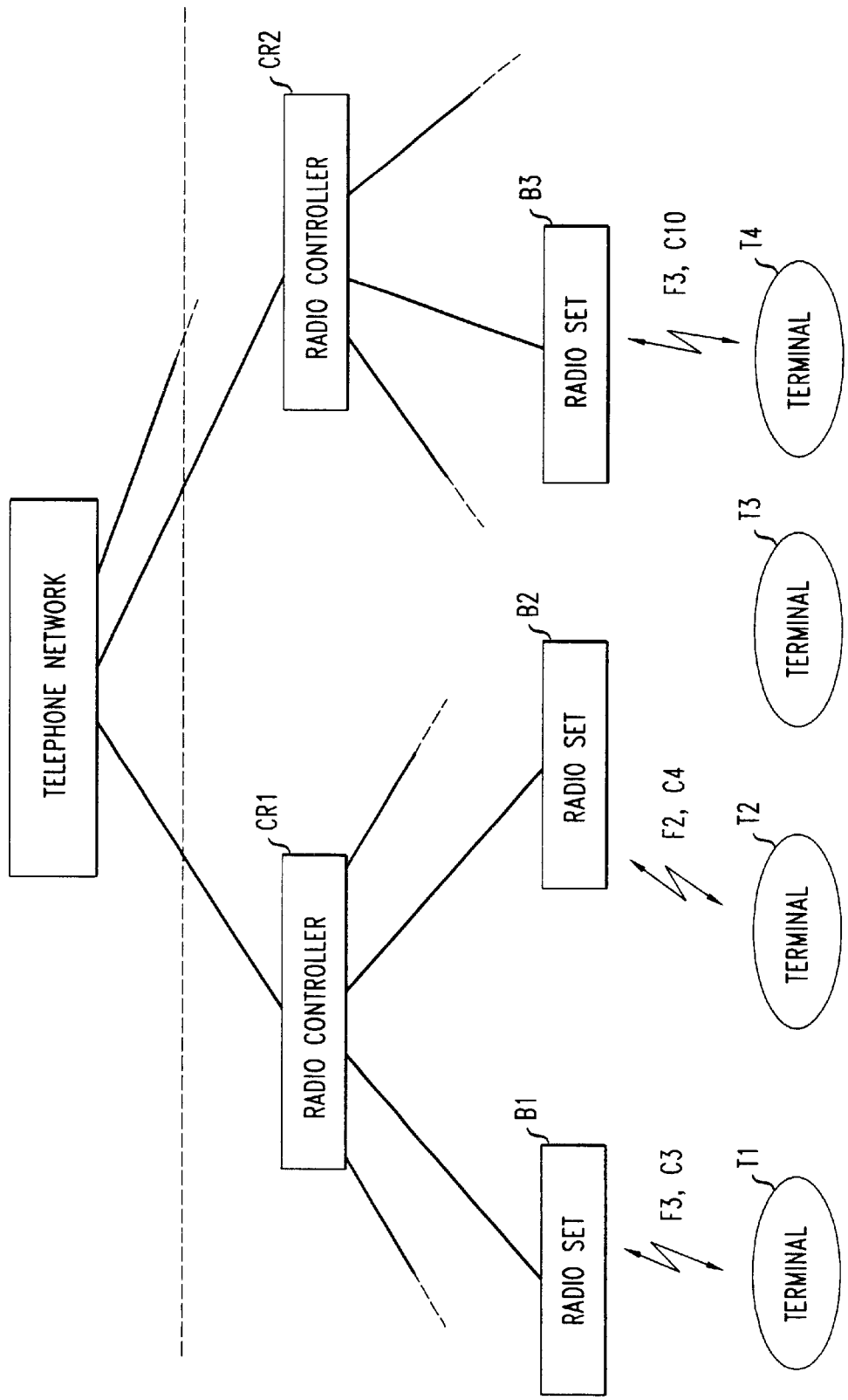
FIG. 1 is a known cordless communication system.
Figure 2:
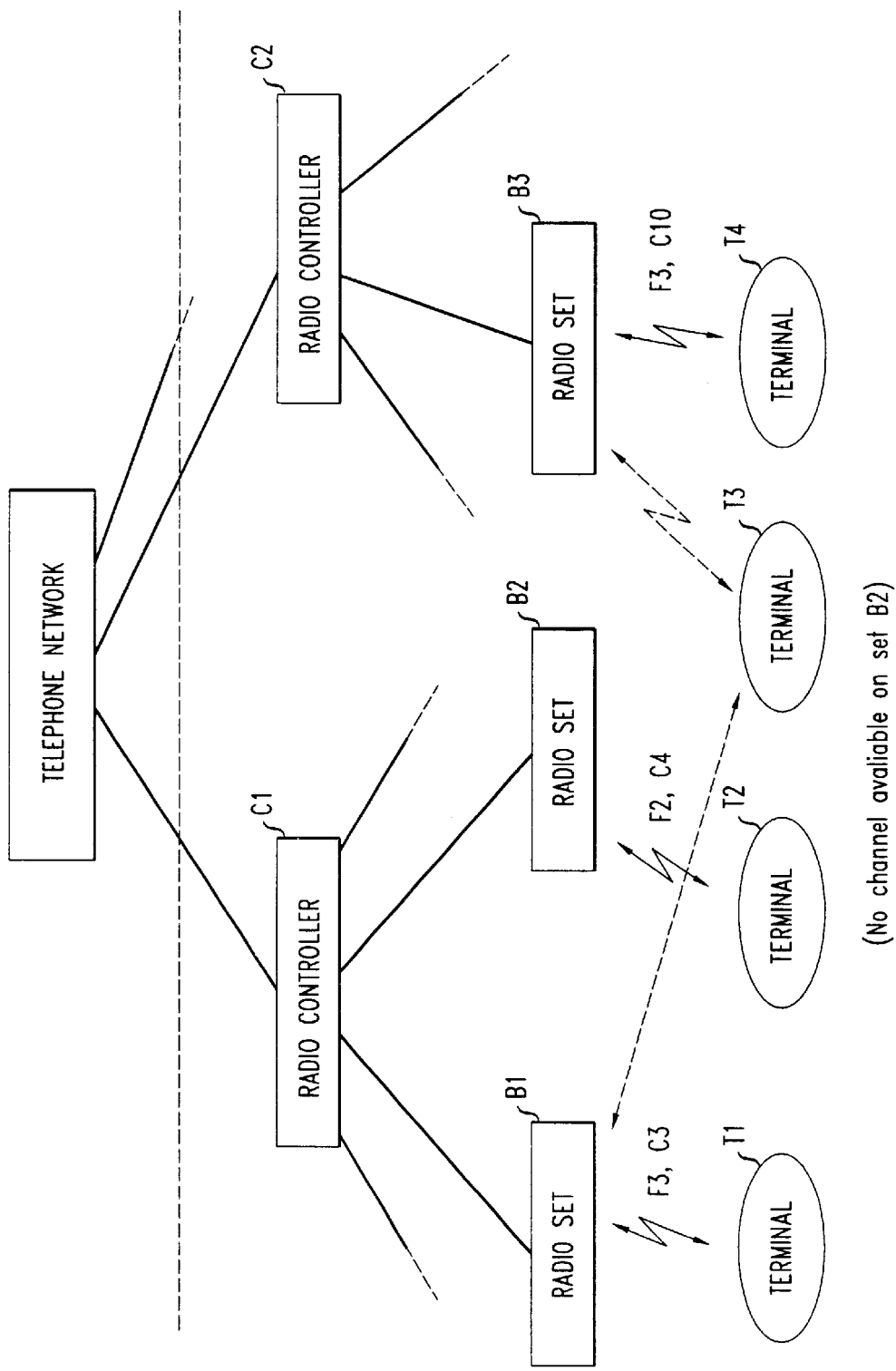
FIG. 2 is a communication system according to the invention.

In FIG. 2, radio set B2 is saturated. Terminal T3 to be locked onto the set B2. According to the invention, terminal T3 will attempt to lock onto another non-saturated radio set, for example B1 or B3. This will make it possible to reduce the probability of system blockage.

Likewise, if radio controller CR1 is saturated, terminal T3, which was previously locked onto the radio set B2, will attempt to lock onto a radio set linked to another radio controller. In the example of FIG. 2, terminal T3 will therefore attempt to lock onto the radio set B3 which to is linked to the non-saturated radio controller CR2.

With this optimised selection of transmission channels it is thus possible to increase the capacity of DECT networks while decreasing the probability of system blockage.

While the invention has been described with reference to a preferred embodiment, it will be understood by those skilled in the art having reference to the specification and drawings that various modifications may be made and various alternatives are possible therein without departing from the spirit and scope of the invention.

I claim:

1. A cordless communication system, comprising:

a plurality of terminals; and a plurality of radio sets with which the terminals can communicate, each radio set being able to simultaneously handle up to a predetermined number of communications without being saturated, each terminal locking onto one of the plurality of radio sets, each terminal being continually aware of the state of the radio set onto which it is locked, and responsive to the radio set becoming saturated, the terminal triggers an operation of locking onto another radio set.

2. A cordless communication system comprising:

a plurality of terminals;

a plurality of radio sets with which the terminals can communicate, each radio set being able to simultaneously handle up to a predetermined number of communications without being saturated, each terminal locking onto one of the plurality of radio sets, each terminal being continually aware of the state of the radio set onto which it is locked, and responsive to the radio set being saturated, the terminal triggers an operation of locking onto another radio set; and radio controllers linked groupwise to the plurality of radio sets, the radio controllers being linked to a telephone network, each terminal being aware of the state of the radio controller linked to its radio set, and responsive to the radio controller being saturated, the terminal triggers an operation of locking onto another radio set linked to another radio controller.

3. The system according to claim 1, wherein:

the cordless communication system is operating under the DECT standard; and the predetermined number of communications each radio set is able to handle without being saturated is twelve.

4. The system according to claim 1, wherein each terminal examines the state of the radio set onto which it is locked.

5. The system according to claim 2, wherein each terminal examines the state of the radio controller linked to the radio set onto which the terminal is locked.

6. A cordless communication system, comprising:

a plurality of terminals;

a plurality of radio sets with which the terminals can communicate, each terminal locking onto one of the plurality of radio sets; and one or more radio controllers linked groupwise to the plurality of radio sets, the radio controllers being linked to a telephone network, and responsive to a particular radio controller being saturated, the terminal, which is locked to the radio set linked to that particular radio controller, triggers an operation of locking onto another radio set linked to another radio controller.

7. The system according to claim 6, wherein each terminal examines the state of the radio controller linked to the radio set onto which the terminal is locked.

* * * * *